US010237306B1

(12) United States Patent
Robinson

(10) Patent No.: US 10,237,306 B1
(45) Date of Patent: Mar. 19, 2019

(54) COMMUNICATING SERVICE ENCRYPTION KEY TO INTERCEPTOR FOR MONITORING ENCRYPTED COMMUNICATIONS

(71) Applicant: EMC IP Holding Company LLC, Hopkinton, MA (US)

(72) Inventor: Peter Alan Robinson, Enoggera Reservoir (AU)

(73) Assignee: EMC IP Holding Company LLC, Hopkinton, MA (US)

(*) Notice: Subject to any disclaimer, the term of this patent is extended or adjusted under 35 U.S.C. 154(b) by 274 days.

(21) Appl. No.: 15/197,963

(22) Filed: Jun. 30, 2016

(51) Int. Cl.
H04L 9/08 (2006.01)
H04L 29/06 (2006.01)
H04L 9/32 (2006.01)

(52) U.S. Cl.
CPC ............ H04L 63/306 (2013.01); H04L 9/083 (2013.01); H04L 9/3268 (2013.01)

(58) Field of Classification Search
CPC ............................... H04L 63/306; H04L 9/083
USPC .......................................................... 713/156
See application file for complete search history.

(56) References Cited

U.S. PATENT DOCUMENTS

| 6,948,060 B1 | 9/2005 | Ramanathan |
| 8,914,629 B2 | 12/2014 | Rubin et al. |
| 2010/0217987 A1* | 8/2010 | Shevade ............ G06F 21/6272 713/175 |
| 2011/0072270 A1* | 3/2011 | Little ...................... H04L 12/66 713/175 |
| 2012/0170753 A1* | 7/2012 | Pandrangi ........... G06F 21/6209 380/286 |
| 2012/0290833 A1* | 11/2012 | Clegg ................... H04L 9/3226 713/156 |
| 2013/0236019 A1* | 9/2013 | Zaverucha ............ H04L 9/3263 380/278 |
| 2014/0164776 A1* | 6/2014 | Hook ........................ H04L 9/14 713/171 |
| 2016/0004884 A1* | 1/2016 | De Atley .............. H04L 9/0861 726/30 |
| 2017/0093587 A1* | 3/2017 | Glisson ................. H04L 9/3268 |

* cited by examiner

Primary Examiner — Jason K Gee
Assistant Examiner — Dereena T Cattungal
(74) Attorney, Agent, or Firm — BainwoodHuang

(57) ABSTRACT

A disclosed method includes operations of a control computer and interceptor computer. The control computer creates a certificate request and sends it to a certificate issuer, the certificate request created with an encrypted blob including a service private key S-PrK encrypted with an escrow server public key E-PuK. The control computer receives the certificate from the certificate issuer and provisions it to the service server along with S-PRK for use in secured communications with clients. The interceptor computer monitors session-establishment communications, e.g. a TLS handshake, between the service server and client to obtain the digital certificate, and retrieves the encrypted blob from the certificate and sends it to the escrow server. The escrow computer retrieves S-PrK by decrypting the encrypted blob using the escrow private key E-PrK, and returns S-PrK to the interceptor, where it is used to decrypt secure-session communications between the client and service server.

14 Claims, 3 Drawing Sheets

COMMUNICATING SERVICE ENCRYPTION KEY TO INTERCEPTOR FOR MONITORING ENCRYPTED COMMUNICATIONS

BACKGROUND

The present invention is related to the field of computer system security, and in particular to techniques for monitoring otherwise secure inter-computer communications.

SUMMARY

In the field of computer system security, it is known to employ data encryption to protect inter-computer communications against eavesdropping or other unauthorized access to any information contained therein. As an example, a technique known as Transport Layer Security or TLS is widely used in Internet communications, namely as part of the HTTPS protocol.

There can be a need for lawful monitoring of communications. For example, an enterprise may need to monitor communications of its servers and/or clients (e.g., employee computers) for purposes of detecting unauthorized activity. Examples are given below. One technique for monitoring such communications is to employ an interceptor or "man in the middle" through which the communications travel.

Monitoring encrypted communications using an interceptor requires somehow providing the session encryption key(s) to the interceptor. One straightforward approach to providing encryption keys to an interceptor is to persistently store the keys in a special-purpose key server from which the interceptor can obtain them. In the context of a large, multi-server system, such a key server would have to store all server private keys. Many private keys would need to be stored securely in the key server, which would be harder than just securing one key for example. Also, the private keys would need to be communicated to the key server securely, which might be complex and risk compromising the private keys. Another approach is to use a solution provided by BlueCoat Systems, Inc. in which all clients contain a certificate that they trust, obtained from a specialized certificate authority. Such a solution requires that the certificate-authority certificate must be put into all web browsers on all employee computers, for example.

A technique is disclosed of securely communicating a service private key to an interceptor to enable monitoring of secure-session communications. The technique involves an unobtrusive addition to regular processes of obtaining and utilizing security certificates such as used in TLS for example. The technique avoids the drawbacks of the other potential solutions above. In particular, it avoids the need for persistent storage of server private keys at a key escrow server that participates like a key server in the technique.

A disclosed method includes respective operations of a control computer, such as a system management computer, and an interceptor computer such as a gateway. The control computer creates a certificate request for a digital certificate on behalf of a service server and sends the certificate request to a certificate issuer, the certificate request being created with an encrypted blob including a service private key encrypted with a public key of an escrow server. The control computer also receives the digital certificate from the certificate issuer and provisions the digital certificate to the service server along with the service private key for use by the service server in engaging in secured communications with service clients. The interceptor computer monitors session-establishment communications, such as a handshake process, between the service server and a service client to obtain the digital certificate therefrom. It retrieves the encrypted blob from the digital certificate and sends it to the escrow server in a request for decryption and return of the service private key. Upon receiving the service private key from the escrow server in response to the request, the interceptor computer subsequently monitoring encrypted secure-session communications between the service server and the service client using the service private key to decrypt the secure-session communications. As mentioned, the monitoring may be employed for a variety of purposes, examples of which are described.

In one embodiment, creating the certificate request includes, by the control computer, creating a subject name serial number to be included in the certificate, the subject name serial number including the encrypted blob. Additionally, retrieving the encrypted blob and sending it to the escrow server includes, by the interceptor computer, extracting the subject name serial number from the certificate and sending it to the escrow server.

In one embodiment, the method further includes, by the control computer, obtaining the public key of the escrow server by receiving it in a communication from the escrow server.

In one embodiment, the method further includes, by the control computer, generating the service private key as part of generating a service key pair for use in the secure-session communications, and sending the service private key to the service server in connection with provisioning the certificate to the service server.

In one embodiment, the interceptor computer is a gateway providing access to the service and forwarding of communications between the service server and the client. The interceptor computer may also maintain a secure communications channel to/from the escrow server by which the request is sent to the escrow server and the service private key is received from the escrow server.

The disclosed technique may be used in a variety of ways. Generally it enables a monitoring entity (person or machine) to examine the contents of the client-server communications for any of a variety of purposes. A monitoring entity can monitor access to documents, database information, and other data to identify who has accessed and/or modified such data. If data is being exfiltrated in connection with an intrusion, this event may be identified partly based on examining the client-server communications. And although the present description is directed to an example having a private service server, it may also be usable to monitor communications involving a public server, generally for security-related purposes.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
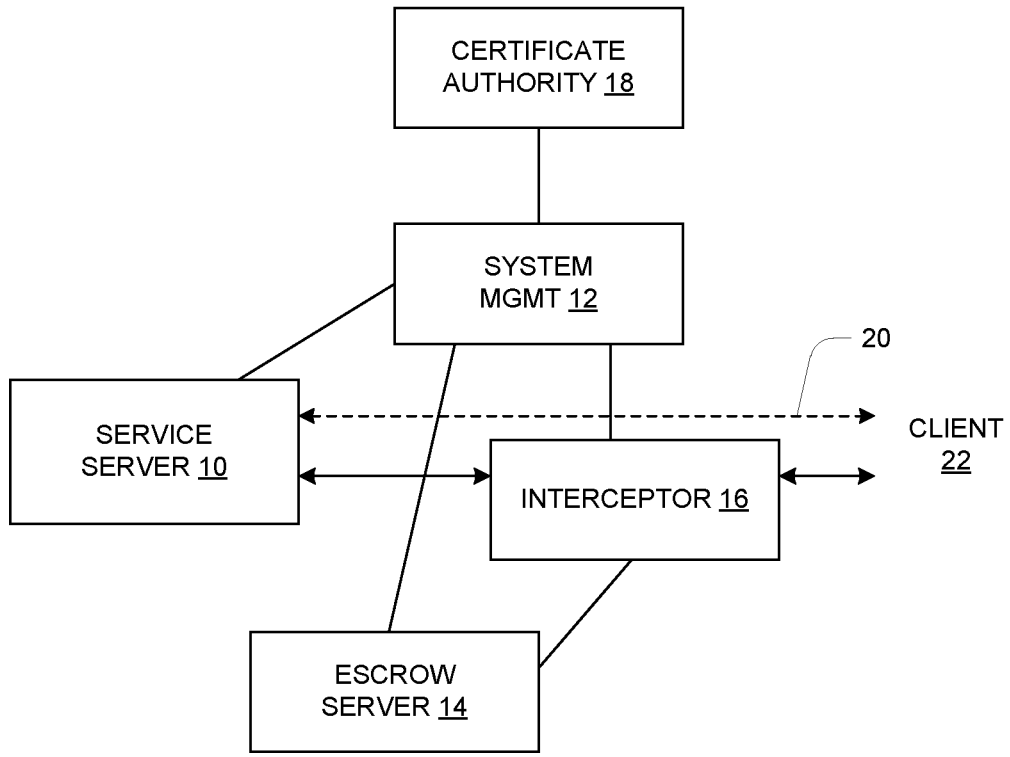
FIG. 1 is a block diagram of a computer system.

FIG. 1 shows a computer system as may be operated by an enterprise such as a commercial business for example. It includes a service server 10, system management (MGMT) computer 12, escrow server 14 and interceptor computer 16. Also shown is a certificate authority 18, which is typically operated by an independent certificate authority organization. The system management computer 12 is also referred to as a "control computer" herein, and the certificate authority 18 is also referred to as a "certificate issuer".

In operation, the service server 10 engages in a secure communications session 20 with a client computer or client 22, which may be a computer of an enterprise employee for example. The secure communications session 20 is used in connection with one or more computer services provided by the service server 10. As an example, the client 22 may be accessing a database operated by the service server 10, and the secure communications session 20 conveys database queries and responses. Myriad other types of client-server interactions, and corresponding communications in the secure communications session 20, may be employed in various embodiments.

Part of system operation is directed to monitoring the client-server communications of the secure communications session 20, which are referred to as "secure-session communications" herein. The monitoring may be done for any of a variety of reasons, including for example to protect against hacking or other unauthorized use of the computer system. In a typical embodiment the secure communications session 20 is an HTTPS session using Transport Layer Security (TLS). In this and other embodiments the secure communications session utilizes RSA® public-key encryption (PKE), and the service server 10 is provisioned with a public-private key pair by the system management computer 12. These keys are referred to herein as "service" keys to distinguish them from other public-private keys described below. The client 22 utilizes the service public key to encrypt its server-directed communications of the secure communications session 20, and the service server 10 uses the service private key to decrypt the received client communications. In typical fashion the secure server 10 uses protective measures to protect against any disclosure of the service private key, which would enable a third party to decrypt the secure-session communications, compromising security. Thus the presently disclosed technique essentially works around the regular protective measures of the service server to intentionally enable such third-party monitoring.

Although FIG. 1 identifies different computers, in alternative embodiments functions may be combined or otherwise redistributed among computers in a different manner. As an example, the system management computer 12 might incorporate the functionality of the escrow server 14, in which case the specific pattern of inter-computer communications would differ accordingly from that described herein.

Figure 2:
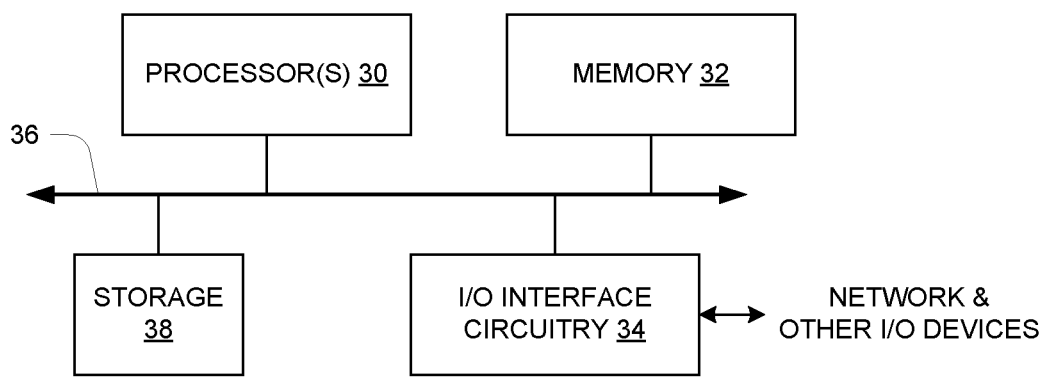
FIG. 2 is a hardware block diagram of a computer.

FIG. 2 shows an example configuration of a physical computer such as the computers 10-16 of FIG. 1 from a computer hardware perspective. The hardware includes one or more processors 30, memory 32, and interface circuitry 34 interconnected by data interconnections 36 such as one or more high-speed data buses. The interface circuitry 34 provides hardware connections to a network via which it communicates with other computers (as in FIG. 1, network not shown) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of an interceptor application, for example, can be referred to as an interceptor circuit or interceptor component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
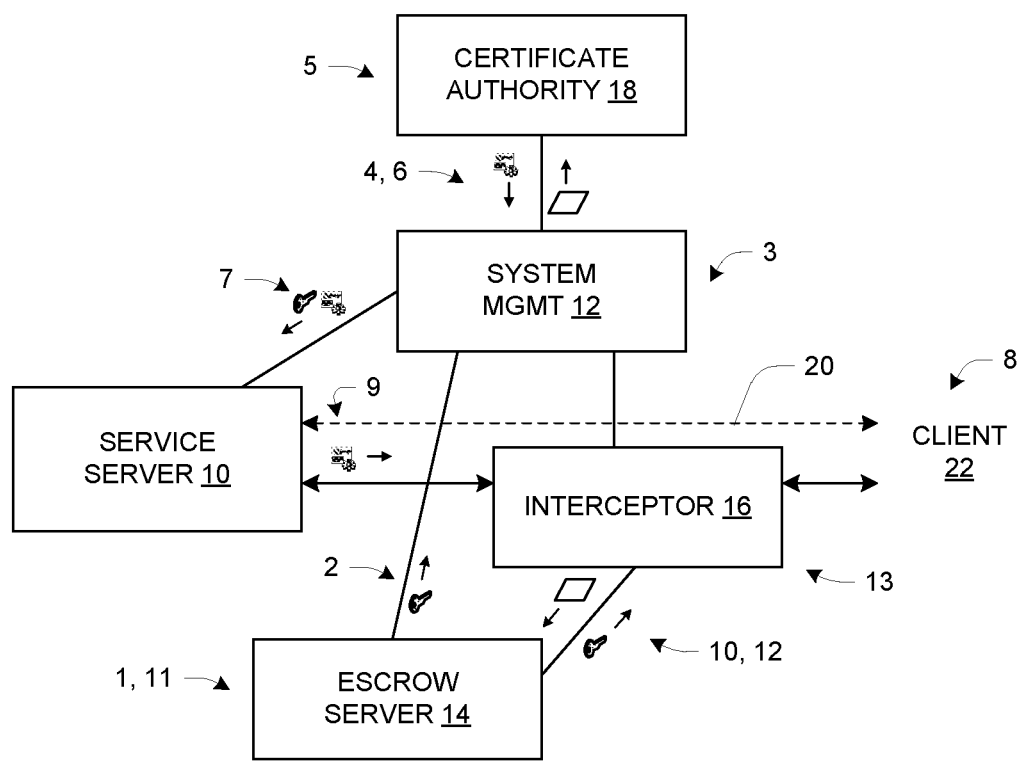
FIG. 3 is a block diagram of the computer system illustrating flow of data items for a process of providing a session private key to an interceptor for monitoring session communications.
Figure 4:
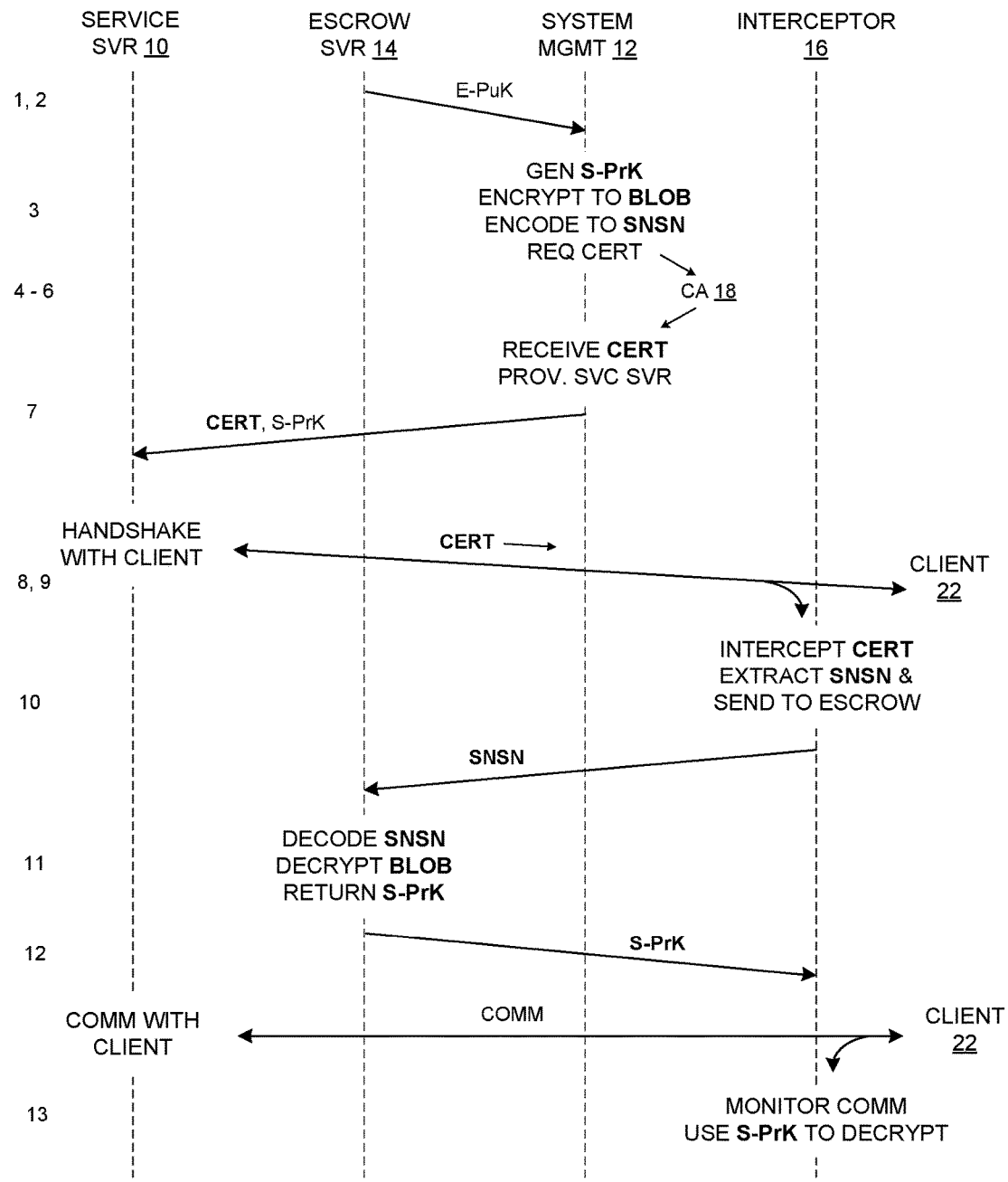
FIG. 4 is a messaging diagram for the process.

FIGS. 3 and 4 illustrate an overall process of communicating a service private key to the interceptor 16 to enable it to decrypt and thus monitor the secure-session communications between the client 22 and service server 10. It will be appreciated that not all the specifics of this process need be utilized in any given embodiment. Key aspects of the process are briefly described further below. Generally, the technique exploits a standard session-establishment process (e.g., TLS handshake) and an opaque data field of a security certificate (e.g., X.509 certificate) that is communicated to a client by a service server.

FIG. 3 shows the system with indications of data items flowing among the components, which occurs in connection with the process of communicating the service private key to the interceptor 16. In FIG. 3, both the data items as well as the acting components (escrow server 14, etc.) are enumerated according to the enumerated steps of the below-described process, indicating where/how the steps are performed.

FIG. 4 is a message-flow diagram for the process, and also includes enumeration per the process description below. In FIG. 4, the following abbreviations are used to refer to corresponding process items:
E-PuK Escrow-server public key
S-PrK Service private key
SNSN Subject Name Serial Number
CERT Security Certificate Also in FIG. 4, bolding is used to highlight the data items involved in communicating the service private key to the interceptor 16.

Now referring to both FIG. 3 and FIG. 4, the process is as follows:

1. An escrow-server key pair is generated for use in securely communicating data to the escrow server 14 in a later part of the process. This key pair could be generated by the escrow server 14 itself
2. The escrow-server public key (E-PuK) is sent to the system management computer 12, while the private key is kept in the escrow server 14.
3. The system management computer 12, under control of system management personnel, generates a service key pair and creates a certificate request. The service private key (S-PrK) is encrypted into a "blob" using the escrow-server public key, and the encrypted blob is put into a Subject Name Serial Number (SNSN) field of the certificate request. The SNSN field is distinct from the serial number field of the certificate; it is part of a subject name field which is a separate, standard part of the certificate. The SNSN is not length constrained, and is opaque to most certificate-related inter-operation processes, including the handshake operation. In the present technique, the SNSN is an application-specific value that is used to communicate the service private key to the interceptor 16.

4. The system management computer 12 sends the certificate request, including the SNSN, to the certificate authority 18.
5. The certificate authority 18 generates the certificate, including the SNSN therein.
6. The certificate authority 18 sends the generated certificate to the system management computer 12 in response to the certificate request.
7. The system management computer 12 provisions the service server 10 with the service private key and the generated certificate. The service private key is provided individually and explicitly, separate from the certificate, in the provisioning process. It will be appreciated that the service private key is also embedded in the certificate as explained above, but the service server 10 is unaware of this fact and has no ability to access the contents of the SNSN encrypted with the escrow server public key.
8. The client 22 initiates a secure connection to the service server 10 via the interceptor 16. It will be appreciated that the interceptor 16 acts as a gateway in a generic sense, i.e., it is a service access point and communications forwarding device. It may use conventional proxying techniques as generally known in the art.
9. As part of the handshake portion of initializing the secure communications session 20, the service server 10 sends the certificate to the client 22 via the interceptor 16.
10. The interceptor intercepts the certificate, extracts the Subject Name Serial Number, and sends it to the escrow server 14. Here "intercept" refers to forwarding a copy to a separate destination (i.e., the escrow server 14), in addition to forwarding it to the client 22 in the normal course of forwarding the handshake messages.
11. The escrow server 14 decodes the SNSN to obtain the encrypted blob. It uses its escrow-server private key to decrypt the blob to obtain the service private key.
12. The escrow server 14 returns the service private key to the interceptor 16. For security, this communication may be secured in some manner, such as by separate encryption.
13. The interceptor 16 uses the service private key to decrypt the secure-session communications between the client 22 and service server 10.

The following are considered key aspects of the above process:

1. The system management computer (control computer) 12 creating and sending the certificate request on behalf of the service server, the certificate request including the encrypted blob with the service private key encrypted with the public key of the escrow server, so that the issued certificate includes the service private key appropriately protected (e.g., in encrypted blob within the SNSN).
2. The interceptor computer 16 retrieving the encrypted blob from the digital certificate as it is communicated to the client (e.g., in the handshake), and sending it to the escrow server 14 to obtain the decrypted service private key for use in decrypting the secure-session communications between the service server 10 and the client 22.

It should be noted that there may be time-related constraints on the use of the service private key. In particular, for Diffie-Hellman based cipher suites which use ephemeral keys, active, real-time interception is needed, as a key used in a given epoch is not usable to decrypt communications of other epochs. For RSA key transport (non-Diffie-Hellman), decryption might be performed on stored communications content obtained from an earlier active session.

While various embodiments of the invention have been particularly shown and described, it will be understood by those skilled in the art that various changes in form and details may be made therein without departing from the spirit and scope of the invention as defined by the appended claims.

What is claimed is:

1. A method, comprising
   A) by a control computer:
      creating a certificate request for a digital certificate on behalf of a service server and sending the certificate request to a certificate issuer, the certificate request being created with an encrypted blob including a service private key encrypted with a public key of an escrow server; and
      receiving the digital certificate from the certificate issuer and provisioning the digital certificate to the service server along with the service private key for use by the service server in engaging in secured communications with service clients;
   and
   B) by an interceptor computer:
      monitoring session-establishment communications between the service server and a service client to obtain the digital certificate therefrom;
      retrieving the encrypted blob from the digital certificate and sending it to the escrow server in a request for decryption and return of the service private key; and
      receiving the service private key from the escrow server in response to the request, and subsequently monitoring encrypted secure-session communications between the service server and the service client using the service private key to decrypt the secure-session communications,
   wherein, in the provisioning of the digital certificate to the service server along with the service private key, the service private key is provided to the service server individually and explicitly and separate from the digital certificate, and wherein the service server is unaware of the presence of the service private key in the encrypted blob of the digital certificate and has no ability to access the contents of the encrypted blob of the digital certificate.

2. The method of claim 1, wherein:
   creating the certificate request includes, by the control computer, creating a subject name serial number to be included in the certificate, the subject name serial number including the encrypted blob; and
   retrieving the encrypted blob and sending it to the escrow server includes, by the interceptor, extracting the subject name serial number from the certificate and sending it to the escrow server.

3. The method of claim 1, further including, by the control computer, obtaining the public key of the escrow server by receiving it in a communication from the escrow server.

4. The method of claim 1, further including, by the control computer, generating the service private key as part of generating a service key pair for use in the secure-session communications, and sending the service private key to the service server in connection with provisioning the certificate to the service server.

5. The method of claim 1, wherein the interceptor computer is a gateway providing access to the service and forwarding of communications between the service server and the client.

6. The method of claim 1, further including, by the interceptor computer, maintaining a secure communications channel to/from the escrow server by which the request is sent to the escrow server and the service private key is received from the escrow server.

7. The method of claim 1, wherein the session-establishment communications monitored for the digital certificate are secure-session handshake communications using a standard handshake protocol.

8. A computer system including a service server, control computer, escrow server, and interceptor configured and operative to perform a method including:
A) by the control computer:
creating a certificate request for a digital certificate on behalf of the service server and sending the certificate request to a certificate issuer, the certificate request being created with an encrypted blob including a service private key encrypted with a public key of the escrow server; and
receiving the digital certificate from the certificate issuer and provisioning the digital certificate to the service server along with the service private key for use by the service server in engaging in secured communications with service clients;
and
B) by the interceptor computer:
monitoring session-establishment communications between the service server and a service client to obtain the digital certificate therefrom;
retrieving the encrypted blob from the digital certificate and sending it to the escrow server in a request for decryption and return of the service private key; and
receiving the service private key from the escrow server in response to the request, and subsequently monitoring encrypted secure-session communications between the service server and the service client using the service private key to decrypt the secure-session communications, wherein, in the provisioning of the digital certificate to the service server along with the service private key, the service private key is provided to the service server individually and explicitly and separate from the digital certificate, and wherein the service server is unaware of the presence of the service private key in the encrypted blob of the digital certificate and has no ability to access the contents of the encrypted blob of the digital certificate.

9. The computer system of claim 8, wherein:
creating the certificate request includes, by the control computer, creating a subject name serial number to be included in the certificate, the subject name serial number including the encrypted blob; and
retrieving the encrypted blob and sending it to the escrow server includes, by the interceptor, extracting the subject name serial number from the certificate and sending it to the escrow server.

10. The computer system of claim 8, further including, by the control computer, obtaining the public key of the escrow server by receiving it in a communication from the escrow server.

11. The computer system of claim 8, further including, by the control computer, generating the service private key as part of generating a service key pair for use in the secure-session communications, and sending the service private key to the service server in connection with provisioning the certificate to the service server.

12. The computer system of claim 8, wherein the interceptor computer is a gateway providing access to the service and forwarding of communications between the service server and the client.

13. The computer system of claim 8, wherein the method further includes, by the interceptor computer, maintaining a secure communications channel to/from the escrow server by which the request is sent to the escrow server and the service private key is received from the escrow server.

14. The computer system of claim 8, wherein the session-establishment communications monitored for the digital certificate are secure-session handshake communications using a standard handshake protocol.

* * * * *